United States Patent [19]
Tsukamoto et al.

[11] Patent Number: 5,762,172
[45] Date of Patent: Jun. 9, 1998

[54] HYDRAULIC POWER TRANSMISSION UNIT

[75] Inventors: Kazumasa Tsukamoto, Toyota; Masahiro Hayabuchi, Anjo; Koji Maeda, Anjo; Yutaka Teraoka, Anjo; Makoto Yamaguchi, Sabae, all of Japan

[73] Assignee: Aisin AW Co., Ltd., Japan

[21] Appl. No.: 735,993

[22] Filed: Oct. 24, 1996

[30] Foreign Application Priority Data

| Oct. 24, 1995 | [JP] | Japan | 7-298804 |
| Apr. 8, 1996 | [JP] | Japan | 8-110544 |

[51] Int. Cl.$^6$ ............................................. F16H 45/02
[52] U.S. Cl. ........................................ 792/3.29; 192/212
[58] Field of Search ............................ 192/3.29, 3.28, 192/3.3, 212

[56] References Cited

U.S. PATENT DOCUMENTS

| 4,002,228 | 1/1977 | Borman . |  |
| 4,949,822 | 8/1990 | Martin . |  |
| 5,377,796 | 1/1995 | Friedmann et al. | 192/3.29 |
| 5,441,135 | 8/1995 | Wöner et al. | 192/3.29 |
| 5,590,750 | 1/1997 | Graton et al. | 192/3.29 |
| 5,662,194 | 9/1997 | Jackel | 192/3.29 |
| 5,669,475 | 9/1997 | Matsuoka | 192/3.29 |

FOREIGN PATENT DOCUMENTS

| 2695975 | 3/1994 | France . |
| 2706967 | 12/1994 | France . |
| 4433256 | 4/1995 | Germany . |
| 2255395 | 4/1992 | United Kingdom . |

*Primary Examiner*—Rodney H. Bonck
*Attorney, Agent, or Firm*—Lorusso & Loud

[57] ABSTRACT

A hydraulic power transmission unit includes a casing connected to an engine, a pump member fixed to the interior of the casing and a turbine mounted within the casing and connected to an output shaft, whereby the output torque of the engine is transmitted to the output shaft through fluid in the casing. A damper mechanism includes damper springs mounted directly on the inner face of the casing at its outer circumference. A damper disc serves to transmit the power of the engine to the output shaft through the damper springs. A lock-up clutch mechanism is also housed within the casing and includes a frictional engagement element arranged between the damper disc and the output shaft. The lock-up clutch mechanism is operated, i.e. frictional engagement element selectively applied and released, by a clutch piston slidably mounted within a cylinder defined by the damper disc.

20 Claims, 5 Drawing Sheets

HYDRAULIC POWER TRANSMISSION UNIT

BACKGROUND OF THE INVENTION

1. Field of the Invention

The present invention relates to a hydraulic power transmission unit ("fluid coupling"), e.g. torque converter, for transmitting the power of an engine through a fluid to a transmission or the like and, more particularly, to a hydraulic power transmission unit having a damper mechanism and a lock-up clutch mechanism.

2. Description of the Prior Art

In a hydraulic power transmission unit having a direct-coupling clutch mechanism ("lock-up clutch"), the direct-coupling clutch mechanism is usually equipped with a damper mechanism for absorbing fluctuation in the output torque of the engine, so that the fluctuation in the output torque is not transmitted when the lock-up clutch is applied.

An improved spring damper mechanism is disclosed in U.S. Pat. No. 5,377,796. As disclosed in U.S. Pat. No. 5,377,796, the damper diameter is enlarged by arranging the damper springs (as exemplified by coil springs) directly on the inner face of the outer circumference of the casing of the torque converter, and the lock-up clutch is constructed of an output member for supporting the damper springs and two pistons arranged to clamp the output member from opposing sides. This lock-up clutch is applied/released by the differential pressure between the oil pressure acting upon the outer faces of the two pistons, i.e., the pressure of the oil within the torque converter, and the oil pressure which is fed through an oil passage to an annular oil chamber between the two pistons and an output member, thereby acting upon the inner faces of the two pistons. In other words, according to this clutch construction, the oil pressure of the torque converter is always acting upon the outer sides of the pistons. When the oil pressure in the oil chamber is low, the two pistons clamp the output member from the opposing sides to apply the lock-up clutch ("applied state"). When a sufficient oil pressure is fed to the oil chamber, on the other hand, the pistons are pushed outward by the oil pressure to release the lock-up clutch ("released state").

U.S. Pat. No. 5,441,135 discloses a torque converter of the type in which the means for applying/releasing the lock-up clutch is exemplified by a cylinder. The lock-up clutch in this torque converter is a multi-disc frictional engagement element, and a cylinder (power pressure chamber) is formed in the boss of a turbine wheel connected to an output shaft (turbine wheel shaft). Responsive to the oil pressure fed to the cylinder, a piston and an elastic return lever (conversion lever) abutting against the piston are axially rotated to apply the clutch. The cylinder is equipped with two seal rings (at the radially inner and outer sides) between it and the piston to enhance the liquid seal.

In recent years, slip control of the lock-up clutch has been adopted to reduce power loss in the torque converter. For slip control, it is necessary to hold the application pressure of the clutch at a predetermined level with high accuracy. For this purpose, the annular oil chamber disclosed in U.S. Pat. No. 5,377,796 is sealed at its radially outer side by friction linings and at its radially inner side by O-rings. However, the friction linings do not have a sufficient sealing function to prevent oil from leaking into the oil chamber through a gap between the output member and the piston at the time of application of the lock-up clutch. As a result, it is difficult to control the application pressure with sufficient accuracy for slip control because of a slow response to the change in the oil pressure.

The cylinder defining the power pressure chamber disclosed in U.S. Pat. No. 5,441,135 allows for somewhat better sealing. On the other hand, because the damper (torsional vibration attenuator) is arranged at the radially inner side of the lock-up clutch, it is difficult to provide the damper with a sufficiently large diameter to absorb the torque fluctuation of the engine by itself. The design, in this respect, is less advantageous than that of U.S. Pat. No. 5,377,796. Further, in the mechanism disclosed by U.S. Pat. No. 5,441,135, the cylinder is arranged at the turbine side so that the centrifugal oil pressure in the cylinder is generated by the rotation of the turbine, but the centrifugal oil pressure in the case, i.e., outside of the cylinder, is generated by the rotation of the case, i.e., the engine rotation. In this arrangement, with the lock-up clutch being in the slip state, the rotation of the case is faster than that of the turbine so that the centrifugal oil pressure in the case exceeds that in the cylinder, thereby lowering the application pressure of the lock-up clutch to an extent corresponding to the difference between the two centrifugal oil pressures. As a result, the application pressure of the clutch cannot be sufficiently retained. If, to address this problem, the cylinder was to be arranged at the case side, the damper would be connected at the turbine side so that the damper springs could not be directly mounted on the case.

SUMMARY OF THE INVENTION

It is, therefore, a first object of the present invention to provide a hydraulic power transmission unit in which the diameter of the damper can be enlarged by mounting the damper springs directly on the inner face of the outer circumference of a casing, in which the cylinder of the lock-up clutch mechanism is sealed liquid-tight and in which the cylinder is rotated at the same speed as that of the casing.

A second object of the present invention is to improve the control accuracy for a frictional engagement element of the lock-up clutch mechanism.

A third object of the present invention is to simplify the hydraulic circuit for the unit by partially sharing oil passages for feeding/releasing the oil pressure to and from the unit.

A fourth object of the present invention is to retain a sufficient capacity for the feed/release oil passages while simplifying the hydraulic circuit by partially sharing the feed/release oil passages, as described above.

A fifth object of the present invention is to prevent the wear of the contacting faces between the piston and plate of the frictional engagement element in the aforementioned lock-up clutch mechanism by preventing relative rotation between the plate and the piston.

A sixth object of the present invention is to conserve material in press forming the damper disc of the hydraulic power transmission unit.

A seventh object of the present invention is to reduce the number of parts while improving the material yield when the damper disc is press formed.

An eighth object of the present invention is to enhance the cooling performance by improving the circulation of the oil through the hydraulic power transmission unit.

In order to achieve the foregoing first objective, the present invention provides a hydraulic power transmission unit including a casing connected to the vehicle engine, a pump element fixed to the interior of the casing and a turbine member mounted within the casing and connected to an output shaft, whereby the power of the engine is transmitted to the output shaft through fluid contained within the casing.

A damper mechanism, including damper springs mounted directly on the inner face of the outer circumference of the casing, and a damper disc, transmits the power of the engine to the output shaft through the damper springs. A lock-up clutch mechanism includes a frictional engagement element arranged between the damper disc and the output shaft and an operator therefor in the form of a piston for selectively applying/releasing the frictional engagement element and a cylinder sealed liquid-tight between the piston and the damper disc.

In order to also achieve the aforementioned second objective, the damper disc is optionally supported on the output shaft.

In order to achieve the aforementioned third objective, an oil passage is preferably formed in the output shaft to provide for oil communication to the interior of the cylinder, and back flow preventing means is provided between the oil passage and the interior of the casing to allow flow of oil from the interior of the casing to the oil passage while blocking reverse flow.

In order to achieve the aforementioned fourth objective, optionally, the output shaft terminates at the damper disc while leaving an axial space radially interior of the damper disc, and the back flow preventing means is arranged in the axial space and fixed to the damper disc.

In order to achieve the aforementioned fifth objective, optionally, the frictional engagement element of the lock-up clutch includes a plate connected to the damper disc, and a friction member connected to the output shaft, and the piston has relative rotation inhibiting means engaging the plate.

In order to achieve the aforementioned sixth objective, the damper disc may be shaped to form the annular cylinder in which the piston is mounted, and may be fixed at its outer periphery to spring brackets, against which the springs abut.

In order to achieve the aforementioned seventh objective, the frictional engagement element may include a plate connected to the damper disc, and a friction member connected to the output shaft, the piston being formed integrally with the plate.

In order to achieve the aforementioned eighth objective, the hydraulic transmission unit may be in the form of a torque converter with further inclusion of a stator. An oil passage, for circulating the oil through the interior of the casing, is formed between the support shaft of the stator and the casing and between the support shaft and the output shaft, and an oil passage for feeding/releasing the oil to actuate the piston is formed in the output shaft for communication with the interior of the cylinder.

According to the present invention, the damper springs are directly mounted on the inner face of and at the outer circumference of the casing so that the damper can be made sufficiently radially large to absorb the torque fluctuation of the engine at the time of application of the lock-up clutch. The cylinder of the lock-up clutch operating mechanism is sealed liquid-tight between the damper disc and the piston so that the application pressure for slip control can be controlled with sufficient accuracy. Because the cylinder is formed in the damper disc it can be rotated at a speed equivalent to that of the casing so that the centrifugal oil pressure established within the cylinder can exceed that established outside of the cylinder by the rotation of the turbine, to thereby retain the application force of the lock-up clutch. On the other hand, components dedicated solely to the cylinder can be eliminated to reduce the number of parts overall and simplify construction.

In one preferred embodiment, the damper disc is concentrically supported on the output shaft so that the frictional engagement element can be positioned with high accuracy, also preventing unbalance in the hydraulic power transmission unit.

Preferably, no oil pressure is fed to the oil passage when the lock-up clutch is released, so that the oil pressure in the casing is released through the oil passage via the back flow preventing means, to thereby circulate the oil through the hydraulic power transmission unit. At the time of lock-up clutch application, on the other hand, the application pressure is fed via the oil passage to the interior of the cylinder so that the oil pressure in the casing and the application pressure are completely separated by the back flow preventing means. As a result, the feed/release of the clutch application pressure and the discharge of the circulating oil out of the casing can be effected using a single oil passage, thereby avoiding complication of the design of the oil passage.

In another preferred embodiment, the output shaft terminates at the damper disc to leave an axial space open on the radially inner side of the damper disc, and the back flow preventing means is arranged in that space. As a result, the back flow preventing means can have an opening of a diameter which is not restricted by the diameter of the output shaft, to thereby provide sufficient release of the oil pressure from the interior of the casing through the back flow preventing means so that the circulation of the oil, during the period of high heat generation at the time of lock-up clutch release, can be improved to enhance cooling.

In yet another preferred embodiment, the plate of the frictional engagement element is connected to the damper disc and the piston is provided with means for preventing relative rotation by engaging the plate. As a result, it is possible to prevent sliding resistance and the wear of the contacting faces, as might otherwise be caused by the relative rotation between the piston and the plate.

In still another preferred embodiment the damper disc, serving as a cylinder, is a simple press-formed element and the spring brackets are separately manufactured elements so the material from which they are formed can be efficiently used.

In yet another embodiment, the press-formed cylinder and the plate of the frictional engagement element are united so that the number of parts can be reduced while improving the material yield when the damper disc is press-formed.

In another preferred embodiment including a stator, oil circulation through the hydraulic power transmission is improved to enhance cooling by providing an oil passage between the support shaft of the stator and the casing and between the support shaft and the output shaft, and further providing an oil passage, for feeding/releasing the oil for operation of the piston, in the output shaft and in communication with the interior of the cylinder.

BRIEF DESCRIPTION OF THE DRAWINGS

Other objects, features and advantages of the present invention will become apparent from the following description to be made with reference to the accompanying drawings, in which.

DESCRIPTION OF THE PREFERRED EMBODIMENTS

Figure 1:
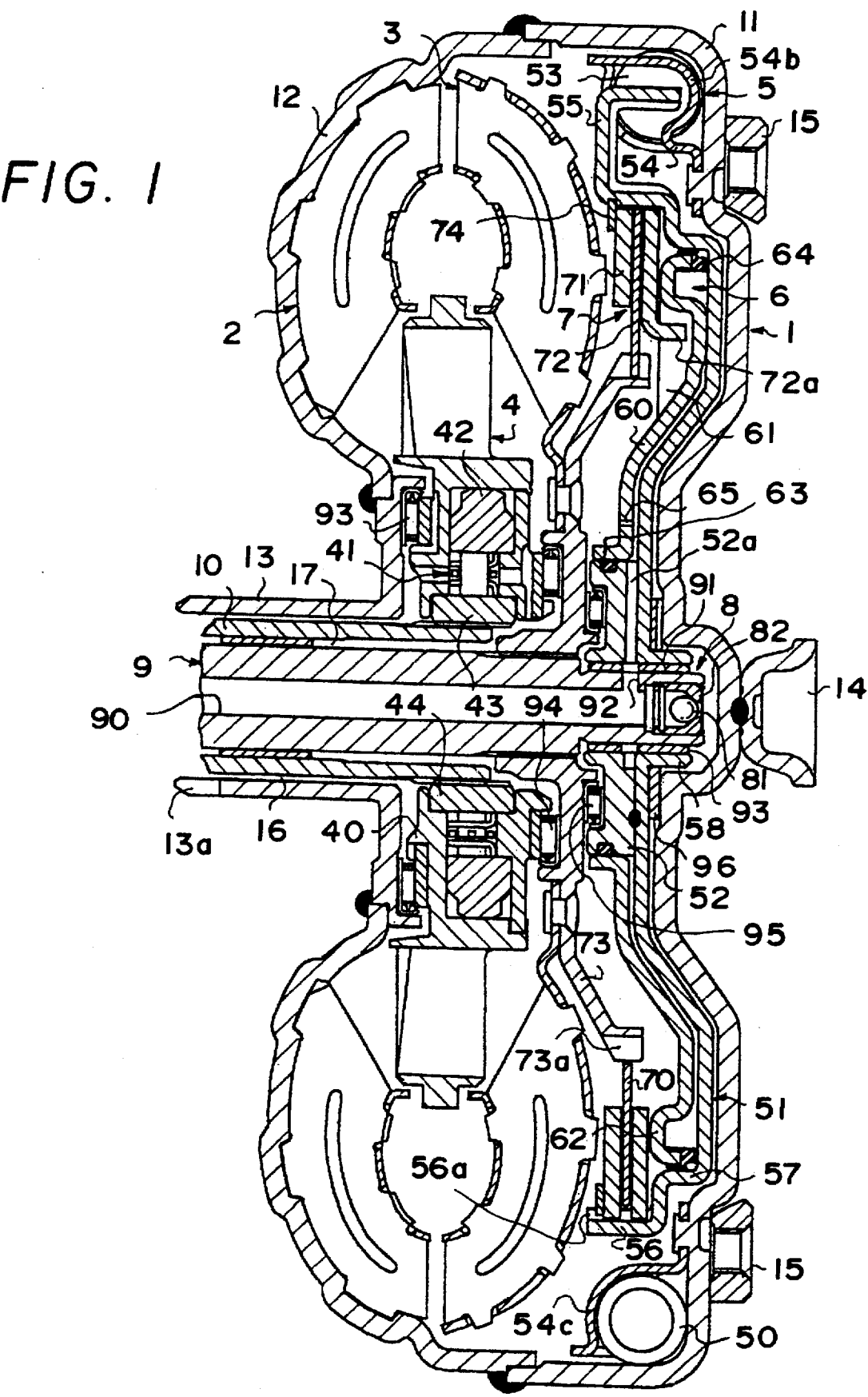
FIG. 1 is an axial section view of a hydraulic power transmission unit according to a first embodiment of the present invention.
Figure 2:
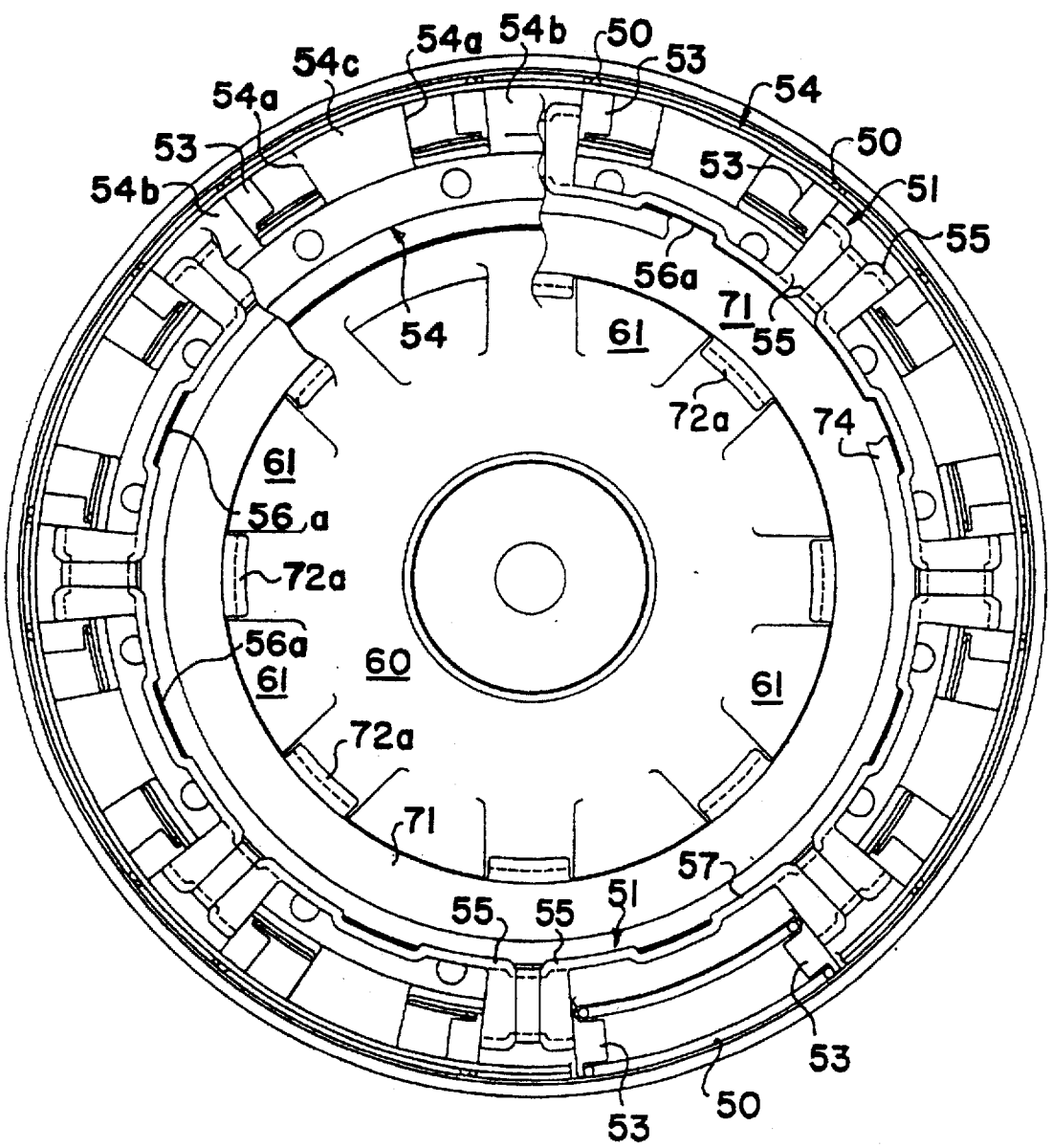
FIG. 2 is a transverse section view, as seen from the inner face of the case, of the damper mechanism and the direct-coupled (lock-up) clutch mechanism of the hydraulic power transmission unit of the first embodiment.

In the first embodiment shown in axial section in FIG. 1 and in transverse section in FIG. 2, the hydraulic power transmission unit of the present invention includes: a casing 1 connected to the engine (not shown); a pump impeller 2 connected to the casing 1; and a turbine runner 3 connected to an output shaft 9. A stator 4 is arranged between the pump impeller 2 and the turbine runner 3 so that the hydraulic power transmission unit operates as a torque converter to transmit the power of the engine through a fluid to the output shaft 9.

The torque converter of this first embodiment further includes a damper mechanism 5 composed of damper springs 50 mounted directly on the inner face of the outer circumference of the casing 1 and a damper disc 51 for transmitting the engine power through the damper springs 50 to the output shaft 9. A frictional engagement element 7 is interposed between the damper disc 51 and the output shaft 9. The lock-up clutch mechanism includes a piston 60 for selectively applying/releasing the frictional engagement element, and a cylinder 6 closed liquid-tight by the piston 60 and the damper disc 51.

In this first embodiment, the damper disc 51 is supported by the output shaft 9. In this output shaft 9 is formed an oil passage 90 to provide communication between the interior of the cylinder 6 and the casing 1. Between the oil passage 90 and the casing 1, is arranged a check valve 8 having a check ball 81 as its valve member and acting as back flow preventing means for allowing the flow of working oil out of the casing 1 into the oil passage 90 but blocking reverse flow. The frictional engagement element 7 is a wet type multi-disc clutch and is composed of pressure plates 71 and 72 connected to the damper disc 51, and a friction member 70 connected to the output shaft 9. The piston 60 is equipped with a rib 61 acting as relative rotation regulating means engaging the pressure plate 72 to control the relative rotation between the piston 60 and the pressure plate 72.

The casing 1 of the first embodiment is composed of: a drum-shaped clutch case portion 11 mounted on the drive plate (not shown) which is fixed on the crankshaft of the engine (not shown); a bell-shaped torque converter case portion 12 providing an outer shell of the pump impeller 2; and a boss portion 13 acting both as a shaft support and as a drive member for an oil pump. These pressed components are united by welding. A center piece 14 is fitted in the crankshaft bore for centering the torque converter with respect to the crankshaft. Also shown in FIG. 1 are a screw seat 15 for receiving a mounting bolt for fixing case portion 11 to the drive plate; and a spline 13a on boss portion 13 for connecting the rotor of the oil pump (not shown).

The pump impeller 2, the turbine runner 3 and the stator 4 are essentially conventional in design and, accordingly, their construction will not be described. As to their arrangement, however, the radially inner side of the turbine runner 3 is riveted to the clutch hub 73 of the lock-up clutch mechanism. A boss portion 40 of the stator 4 is rotatably supported by an inner race 44 and envelopes the outer race 42 of a one-way clutch 41 and a sprag 43. The inner race 44 of one-way clutch 41 is splined to a support shaft 10 extending from the transmission case (not shown) and is thereby prevented from rotating.

As noted above, the output shaft 9 has an oil passage 90 which extends along its axis. The leading end of the output shaft 9 has a splined portion and a radially reduced portion with the hub 73 engaging the splined portion. At the leading end of the oil passage 90 is the aforementioned check valve 8. This check valve 8 is composed of the check ball 81 and seat 82 and is arranged with the check ball 81 at the side of the oil passage 90 and the valve port of the seat 82 at the side of the casing. In the radially smaller portion 91 of the output shaft 9 is a radial oil passage 92 which provides communication between the oil passage 90 and the cylinder 6 by way of an oil passage 52a which extends radially through a thick hub 52 welded to the damper disc 51.

As best seen in FIG. 2, the damper mechanism includes eight compression coil springs 50 with spring seats 53 fitted into each of opposing ends of each spring 50. A spring support member 54 is made of an annular sheet and is fixed at its radially inner side to projections of the case portion 11. The damper disc 51 is made of a sheet and is rotatably supported by the radially smaller portion 91 of the output shaft 9 through a bushing 93. The spring support member 54 is bent at its one side toward the case portion 11 and at its other side away from the case portion 11, across apertures 54a which are formed substantially equidistantly around the circumference. The portion 54b which is bent toward the case portion 11, is held in abutment against the end faces of the adjoining spring seats 53 to thereby support the two ends of the spring 50 both circumferentially and axially. The bent portion 54c, bent away from the case portion 11, supports the circumference of the spring 50 radially. On the other hand, the damper disc 51 is arranged such that abutment portions (spring brackets) 55 each have end elements radially extending from the drum-shaped body into the forward bent portion 54b of the spring support member 54, to engage and hold the individual damper springs 50 through the spring seats 53 formed on these end elements. In the damper disc 51, a radially larger drum portion 56 and a radially smaller cylindrical outer circumference portion 57 are formed by bending the body twice in the axial direction, to provide an axial support portion 58 at the innermost axially bent portion.

FIGS. 1 and 2 show the lock-up clutch mechanism as including the frictional engagement element 7, with the radially larger drum portion 56 of the damper disc 51 serving as its clutch drum. The turbine hub 73 is splined to the output shaft 9 and serves as the clutch hub. The paired pressure plates 71 and 72 have outer circumferential splines engaging the inner circumferential splines 56a of the drum portion 56 and the friction member 70 has an inner circumference spline engaging the outer circumference splines 73a of the hub 73. The cylinder 6 is closed at its outer circumference by the damper disc 51, is closed at its inner circumference by the hub 52 which is integrated with the damper disc 51 and is further defined by the piston 60 which is slidably mounted at its radially inward side on the outer circumference of the hub 52. The radially inward side of the pressure plate 72, confronting the contact face 62 of the piston 60, has eight axially extending engagement pawls 72a, which are received between the eight reinforcing circumferential ribs 61 to improve the rigidity of the piston 60 (made of sheet metal), and to prevent the piston 60 from rotating relative to the pressure plate 72. The piston 60 is constructed by bending an annular sheet into an S-shaped configuration section and is sealed within the cylinder 6, liquid-tight, at its radially inner edge by an O-ring 63 on the outer circumference of the hub portion 52, and, at its radially outer edge, in sliding contact with the cylinder outer circumference portion 57, by a seal ring 64 fitted in its leading end. Moreover, a radially small orifice 65 is provided in piston 60, adjacent to the axially bent portion of the radially inner side of the piston 60, to provide communication between the inside and outside of the cylinder 6.

Roller bearings 93, 94 and 95 are sandwiched between the boss portion 40 of the stator 4 and the boss portion 13 of the casing 1, between the boss portion 40 and the hub 73 and between the hub 73 and the hub 52, respectively, and a thrust washer 96 is sandwiched between the damper disc 51 and the case portion 11. These components function to allow the thrust force acting upon the turbine runner 3 and the stator 4 of the fluid coupling to be borne by the casing 1.

In application of the lock-up clutch, the hydraulic force applied to the rear of the piston 60 is received by the damper disc 51 through the pressure plate 72, the friction member 70, the pressure plate 71 and a stop ring 74, and the reaction against the force on the piston 60 is exerted in reverse upon the damper disc 51 so that a closed loop for the thrust force is established to thereby avoid an unbalancing force which might otherwise move the damper disc 51 axially.

Thus, in the torque converter of this first embodiment, the rotation of the crankshaft of the engine is transmitted on one hand through the casing 1 to the pump impeller 2 and on the other hand through the spring support member 54 to the damper spring 50, the damper disc 51, the pressure plate 72 and the piston 60. During running, the inside of the casing 1 of the torque converter is continuously filled with oil for torque transmission from an annular oil passage 16 between the boss portion 13 and the support shaft 10, and this oil is further fed via the oil passage formed in the boss portion 40 of the stator 4 to the hydraulic transmission space which is defined by the pump impeller 2, the turbine runner 3 and the stator 4.

The pressure for releasing the clutch is a secondary pressure, i.e., a pressure regulated by a secondary regulator valve to a level lower than the line pressure as regulated by a primary regulator valve, so that it may be fed to the individual hydraulic servos. For clutch release, the check ball 81 of the check valve 8 is moved away from its seat to release the oil to the oil passage 90 for circulation through the torque converter when the oil passage 90 is drained through the cooler or the like. In this state, the piston 60 is pushed back by the aforementioned clutch releasing pressure to disengage the frictional engagement element 7 so that the lock-up clutch is released. At this time, as is well known in the art, the engine torque, as transmitted to the casing 1, is further transmitted from the pump impeller 2 through the fluid to the turbine runner 3 and further through the hub 73 to the output shaft 9. The torque fluctuation of the engine in this case is damped as it is transmitted through the fluid, i.e. it is transmitted as a torque whose torsional vibration is attenuated, to the output shaft 9.

In slip control of the lock-up clutch, on the other hand, the clutch application pressure is fed to the oil passage 90 under the control of the lock-up control valve or the like, and the check ball 81 of the check valve 8 becomes seated to shut the leading end of the oil passage 90 so that the clutch application pressure or secondary pressure, as fed to the oil passage 90, or the regulated oil pressure based on the former, is fed through the oil passage 52a to the inside of the cylinder 6. As a result, this pressure fed to the cylinder 6 is increased by the centrifugal force generated by rotation of the cylinder, so that it exceeds the pressure in the casing 1 to extend the piston 60. As a result, the piston 60 clamps the friction member 70 between the pressure plates 71 and 72 so that the torque transmission by the frictional engagement element 7 is effected in parallel with the aforementioned fluid transmission by the torque converter.

In this lock-up or lock-up slip state, the engine torque, as transmitted to the spring support member 54 united with the casing 1, is transmitted through elements 54b to damper springs 50 so that its fluctuation is absorbed by the elastic compression or deformation of the damper springs 50. Thus, the torque is transmitted as torsional vibration attenuated rotation to the damper disc 51, through the pressure plates 71 and 72, and through the friction member 70 and the hub 73 to the output shaft 9. Incidentally, in this lock-up state or lock-up slip state, the check ball 81 is pushed onto the seat 82 by the oil pressure in the oil passage 90 to shut the valve port, as described above, to thereby block the direct feed of the clutch application pressure of the oil passage 90 into the casing 1, while allowing the limited outflow of the clutch application pressure into the casing 1 through the restricted orifice 65. As a result, the oil in the casing 1 can be released via a lubrication oil passage, and oil is circulated through the torque converter in this state also to prevent a rise in the oil temperature within the torque converter, which might otherwise be caused by stagnation of the oil in the cylinder 6 and the casing 1.

In the torque converter thus far described in detail, the damper springs 50 are directly mounted on the inner face of the outer circumference of the casing 1 so that the damper has a sufficiently large diameter to absorb the torque fluctuation of the engine at the time of application of the lock-up clutch. Moreover, the cylinder 6 of the lock-up clutch operating mechanism is defined by the damper disc 51 and the piston 60, with a highly tight liquid seal therebetween, so that the application pressure in slip control can be controlled with sufficient accuracy. The damper disc 51 defining the cylinder 6 is rotated at the same speed (or input r.p.m.) as that of the casing 1 so that the centrifugal oil pressure in the cylinder 6 is higher than the centrifugal oil pressure, generated outside of the cylinder 6 by the rotation (or output rotation) of the turbine runner 3, to thereby retain the application force on the lock-up clutch, especially in a shift from the released state to the applied state and in lock-up slip control. Because of the cylinder design making use of the damper disc 51, components dedicated for the cylinder can be eliminated to reduce the number of parts and to thereby provide a simple construction.

The damper disc 51 is concentrically supported on the output shaft 9 so that the positional accuracy of the frictional engagement element 7 is improved. In addition, the hub 73, serving as a hub both for the turbine runner and for the clutch, and the clutch drum 56, united with the damper disc 51, are supported on the common output shaft 9 so that the unbalance in the overall torque converter can be reduced. In addition, the design of the foregoing embodiment separates the internal pressure of the torque converter from the application pressure by means of the check ball 81 so that the feed/release of the clutch application pressure and the circulation of the oil through the interior of the casing 1 can be effected by way of the single oil passage 90 to thereby avoid a complicated hydraulic circuit design. Moreover, relative rotation between the pressure plate 72 and the piston 60 is prevented by engagement of the pawl 72a of the pressure plate 72 with the rib 61 formed on the piston 60, so that rotational resistance which would result from relative sliding motion therebetween and the wear of their contacting faces can be prevented.

Figure 3:
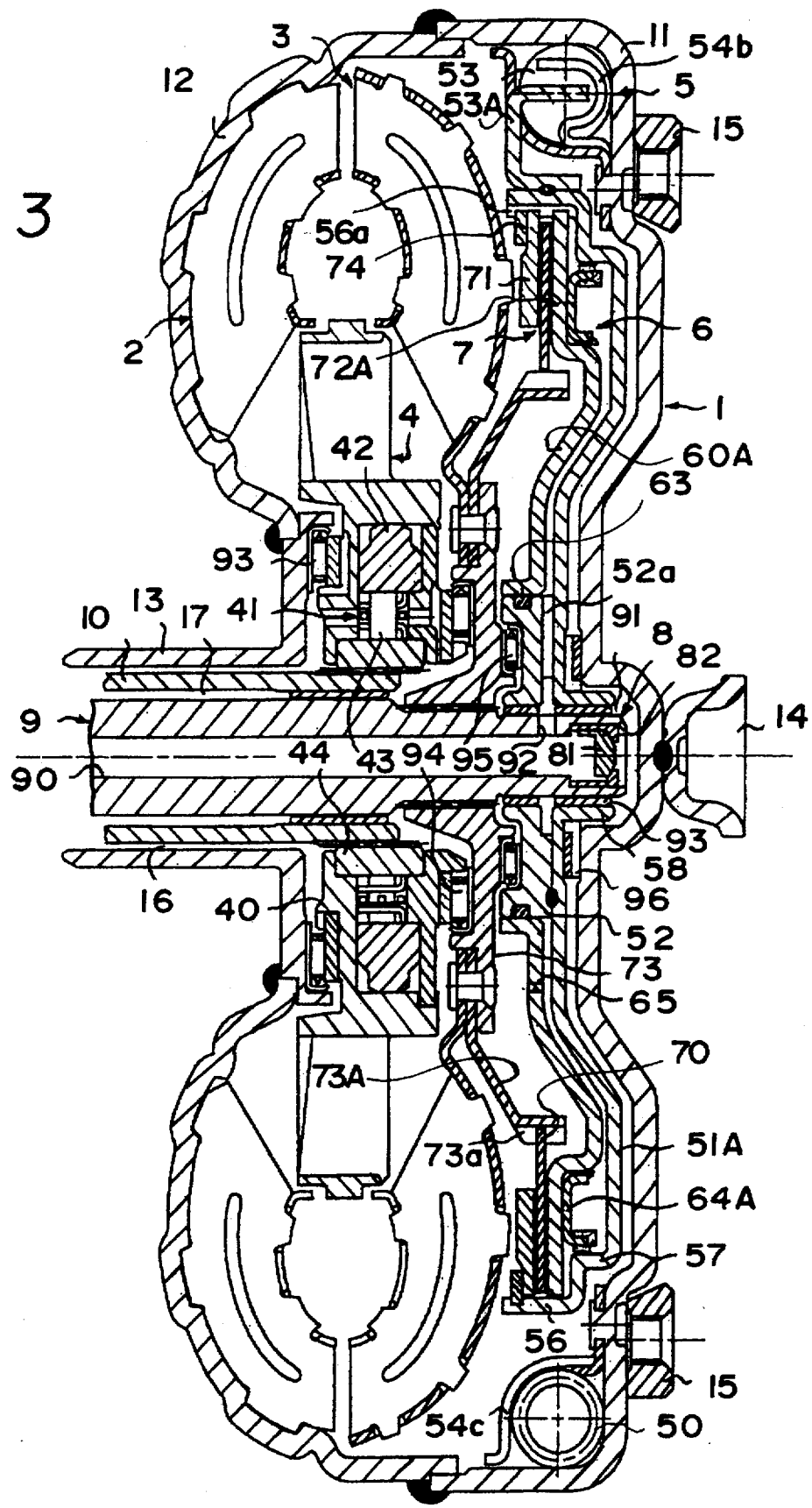
FIG. 3 is an axial section view of a hydraulic power transmission unit according to a second embodiment of the present invention.

FIG. 3 shows a second embodiment of the present invention. As to features substantially identical to those of the first embodiment, the description thereof will be omitted and similar features will be designated by similar reference numerals. Although the piston 60 and the pressure plate 72 are made separate in the foregoing first embodiment, while engaged with each other to prevent relative rotation, in this second embodiment piston 60A and pressure plate 72A are one integral component. Further, in contrast to the first embodiment wherein the abutment portions (spring brackets) 55 are formed integral with the damper disc 51, in this second embodiment the spring brackets 55a are formed as elements separate from damper disc 51A, and are welded to the clutch drum portion 56. Since a portion of the piston 60A is utilized as a pressure plate 72A (piston 60A and pressure plate 72A are one, integral piece), the seal ring 64 of the first embodiment is replaced by an annular seal piston 64A. This seal piston 64A has a C-shaped section and has individual elastic seal rings individually on its inner and outer circumferences, respectively, such that the inner circumference seal is slidably supported on the outer cylindrical face of the piston 60A whereas the outer circumference seal is slidably supported on the cylindrical portion 57 of the damper disc 51A.

In this second embodiment, the valve member 81 of the check valve 8 is not a ball but, rather a poppet element, although functioning essentially the same as the check valve of the first embodiment. Clutch hub member 73A is formed with an outer circumferential spline 73a for supporting the frictional member 70, is made separate from the turbine hub 73 and is riveted to the turbine hub 73 together with the shell of the turbine runner 3. This construction is not especially different in function from that of the first embodiment, but the outer circumferential spline 73a is extended to bite into the piston 60A to obviate the need for a rib 61 to inhibit relative rotation as in the first embodiment. This feature of the second embodiment simplifies the machining of the turbine hub 73 by making the hub member 73A a thinner, lighter and separately pressed article and simplifies the shape of the forged turbine hub 73.

In this second embodiment, the abutment portions (spring brackets) 55A, which have a somewhat complicated shape, need not be integrally formed at the outer circumference of the damper disc 51A when formed by pressing. In this second embodiment the spring brackets 55A can be separately pressed as eight separate small parts, as contrasted with the design shown in FIG. 2. Thus, it is possible to drastically improve the individual material yields for the damper disc 51A and the brackets 55A. Moreover, the number of parts can be reduced by integrally forming the piston 60A and the pressure plate 72A.

Figure 4:
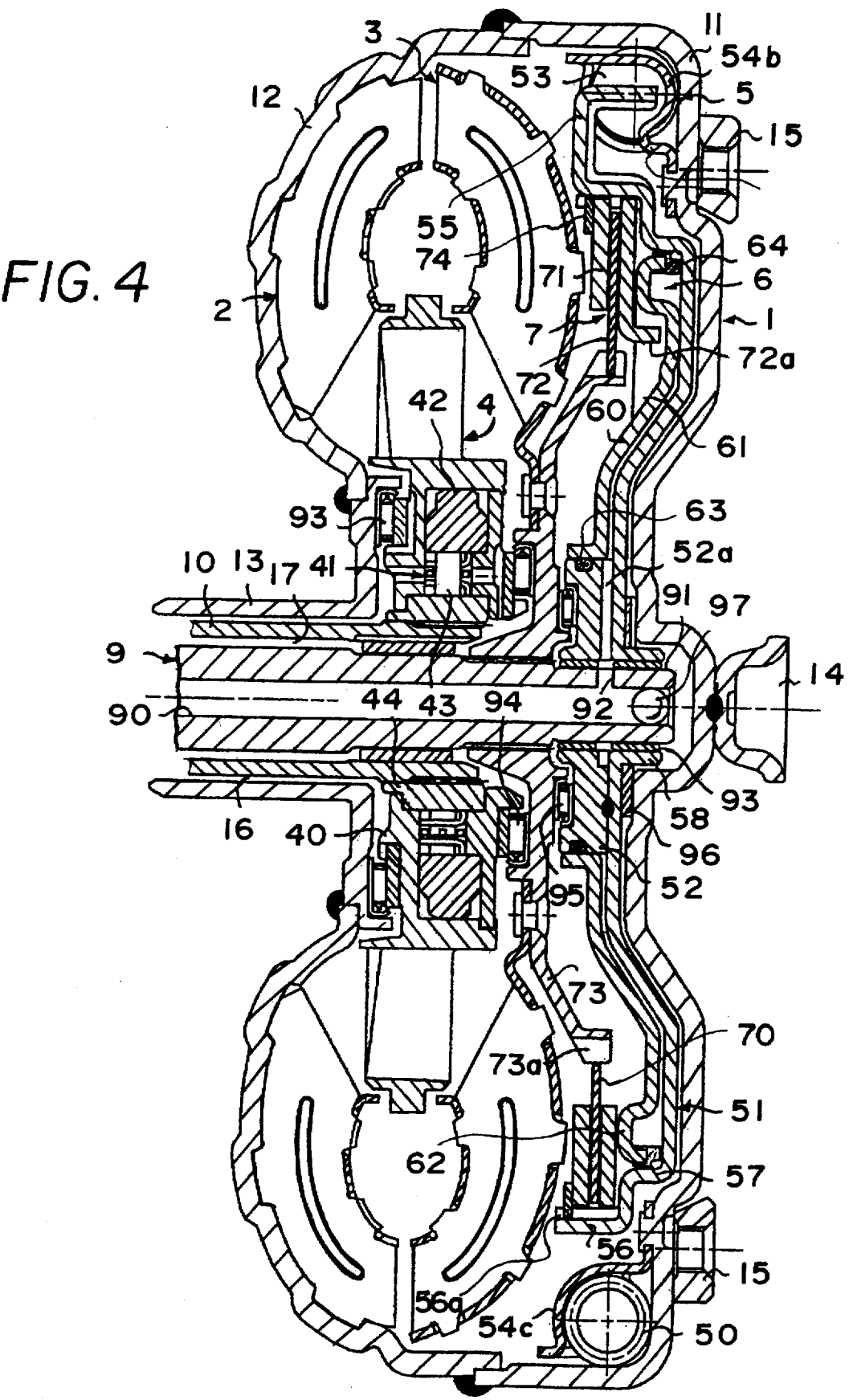
FIG. 4 is an axial section view of a hydraulic power transmission unit according to a third embodiment of the present invention.

FIG. 4 shows a third embodiment of the present invention which is substantially similar in terms of the mechanical components to the first embodiment and differs mainly in the hydraulic circuit (oil passage) arrangement. In the description of this embodiment also, similar elements will not be described and are designated by similar reference numerals. In this third embodiment, the annular oil passages 16 and 17 for circulating the oil through the inside of the casing 1 are formed between (1) the outer circumference of the support shaft 10 supporting the stator 4 through the inner race 44 of the one-way clutch and (2) the inner circumference of the boss portion 13 of the casing 1 and between (3) the inner circumference of the support shaft 10 and (4) the outer circumference of the output shaft 9. In this embodiment, the annular oil passage 16 serves as the feed line at the time of lock-up clutch release while the annular oil passage 17 serves as the return line. In lock-up and lock-up slip, both the annular oil passages 16 and 17 serve as return lines.

The leading end of the oil passage 90 in the output shaft 9 is closed by a ball 97 and is thereby isolated from the interior of the casing 1 when it communicates with the interior of the cylinder 6 via the oil passage 92 and the oil passage 52a. In this embodiment, therefore, the oil passage 90 acts as a dedicated oil passage for feeding/releasing the clutch servo pressure oil into and out of the cylinder 6.

In this third embodiment, the capacity for oil feed into the casing 1 is greater for lock-up and lock-up slip, as compared to that of the first embodiment, so that the efficiency of circulation of the oil through the torque converter can be raised to enhance the cooling efficiency of the oil cooler. On the other hand, the oil passages for feeding/releasing the oil into and out of the cylinder 6 are the same as in the first embodiment.

Figure 5:
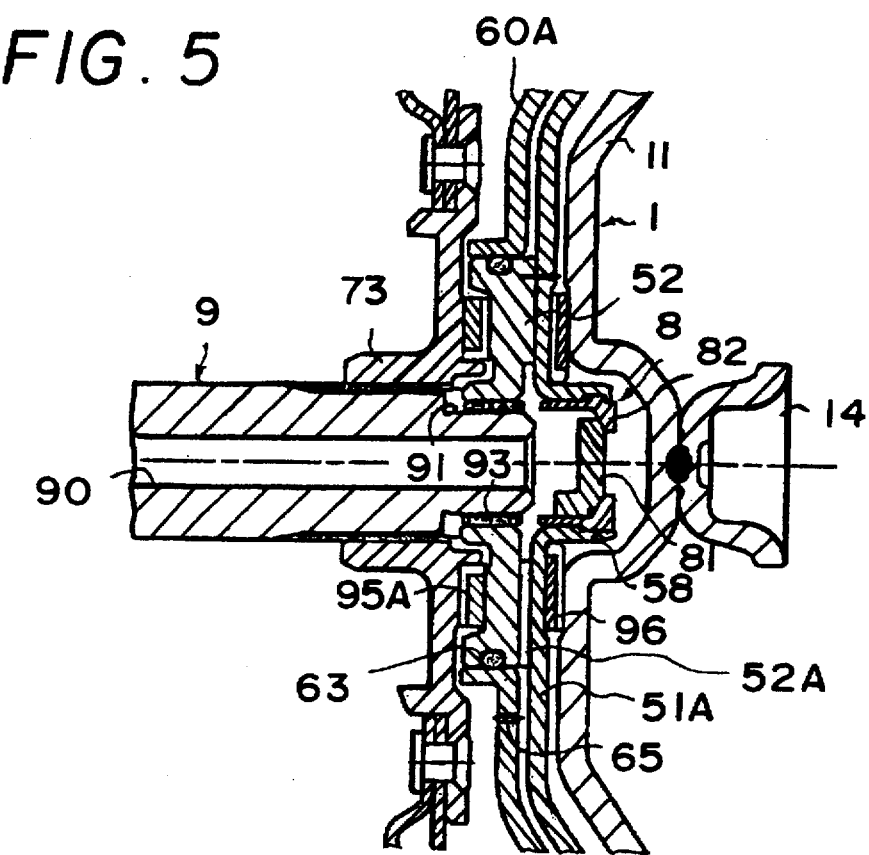
FIG. 5 is an axial section view of a portion of a hydraulic power transmission unit according to a fourth embodiment of the present invention.

FIG. 5 shows a fourth embodiment of the present invention in which the construction of the check valve 8 of the foregoing second embodiment is modified. In describing this fourth embodiment, therefore, the features corresponding to those of the second embodiment will be omitted and such common features will be designated by similar reference numerals. In this fourth embodiment, the output shaft 9 terminates at the damper disc 51A to leave an open axial space radially inside of the damper disc 51A, and the check valve 8 is arranged within that axial space. Specifically, the output shaft 9 terminates in the vicinity of a radial plane defined between the face of the hub 52 and the damper disc 51A. As a result, the oil passage 90 is axially open at that terminal end and communicates with the oil passage 52a of the hub 52 through the aforementioned axial space at the end of the output shaft 9. The seat 82 of the check valve 8 is fixed to the inner circumference of the axially bent portion 58, of the damper disc 51A. In this embodiment, as in the second embodiment, the valve member 81 of the check valve 8 has a poppet shape, but it is radially larger than that of the second embodiment, as is the diameter of the opening of the seat 82. Another difference is that the hub 52 and the turbine hub 73 are supported by a thrust washer 95A having an oil groove; however, in spite of this difference, its function in receiving the thrust force is not especially different from that of the roller bearing 95 in the second embodiment.

If the axial end of the output shaft 9 is shortened, the diameter of the opening of the check valve 8 can be freely set without being restricted by the diameter of the output shaft 9. The centering of the damper disc 51A in this embodiment is effected without any trouble by supporting the hub 52, as welded to the damper disc 51A, on the radially reduced portion 91 of the output shaft 9 through the axially shortened bushing 93.

In this fourth embodiment, the capacity for return of the oil from the casing 1 to the oil passage 90 is larger than that of the second embodiment. As a result, in the case of high heat generation due to the slip of fluid between the pump impeller and the turbine runner at the time of lock-up release, the efficiency of circulation of the oil through the torque converter can be improved to enhance the cooling performance of the oil cooler. On the other hand, the oil passage arrangement for feeding/releasing the oil to and from the interior of the cylinder 6 is as in the second embodiment, i.e. by communication between the oil passage 90 and the oil passage 52a.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hydraulic power transmission unit for use in conjunction with a vehicle engine comprising:
   a casing rotatably driven by output of the engine;
   a pump member fixed to said casing for rotation therewith;
   a turbine rotatably mounted in said casing and connected to an output shaft, whereby the power of the vehicle engine is transmitted to said output shaft through a fluid contained in said casing;
   a damper mechanism including damper springs mounted directly on the inner face of said casing proximate to the outer circumference of said casing, and a damper disc secured to said damper springs for transmitting the power of said engine to said output shaft through said damper springs; and
   a lock-up clutch including a frictional engagement element arranged between said damper disc and said output shaft, a cylinder at least partially defined by said damper disc and a clutch piston for selectively applying/releasing said frictional engagement element, said clutch piston being mounted in said cylinder and forming a sliding liquid seal with said damper disc.

2. A hydraulic power transmission unit as set forth in claim 1, wherein said damper disc is supported on said output shaft.

3. A hydraulic power transmission unit as set forth in claim 2:
   wherein said frictional engagement element includes a plate connected to said damper disc for rotation therewith, and a friction member connected to said output shaft for rotation therewith, and
   wherein said clutch piston carries plate engaging means for engaging said plate to prevent relative rotation between said clutch piston and said plate.

4. A hydraulic power transmission unit as set forth in claim 2, wherein said damper disc is in the form of an annular cylinder, in which said clutch piston is slidably mounted, and is fixed around its outer periphery to at least one spring bracket, against which said springs abut.

5. A hydraulic power transmission unit as set forth in claim 2, wherein said frictional engagement element includes a first plate connected to said damper disc for rotation therewith, and a friction member connected to said output shaft for rotation therewith, and wherein said clutch piston is formed integrally with a second plate for pressing said friction member between said first and second plates.

6. A hydraulic power transmission unit as set forth in claim 2, further comprising a stator, and wherein an oil passage for circulating the oil through the interior of said casing is formed between a support shaft for said stator and said casing and between said support shaft and said output shaft, and wherein an oil passage for feeding/releasing the oil to actuate said clutch piston is formed in said output shaft in communication with the interior of said cylinder.

7. A hydraulic power transmission unit as set forth in claim 2, wherein an oil passage is formed in said output shaft and communicates with the interior of said cylinder, and further comprising back flow preventing means located between said oil passage and the interior of said casing for allowing a flow of fluid from the interior of said casing to said oil passage, while blocking flow in the reverse direction.

8. A hydraulic power transmission as set forth in claim 7, wherein said output shaft terminates at a point axially adjacent said damper disc, leaving an axial space at the radially inner side of said damper disc, and wherein said back flow preventing means is arranged in said axial space and is fixed to said damper disc.

9. A hydraulic power transmission unit as set forth in claim 7, wherein said damper disc is in the form of an annular cylinder, in which said clutch piston is slidably mounted, and is fixed around its outer periphery to at least one spring bracket, against which said springs abut.

10. A hydraulic power transmission unit as set forth in claim 7, wherein said damper disc is in the form of an annular cylinder, in which said clutch piston is slidably mounted, and is fixed around its outer periphery to at least one spring bracket, against which said springs abut.

11. A hydraulic power transmission unit as set forth in claim 7, wherein said frictional engagement element includes a first plate connected to said damper disc for rotation therewith, and a friction member connected to said output shaft for rotation therewith, and wherein said clutch piston is formed integrally with a second plate for pressing said friction member between said first and second plates.

12. A hydraulic power transmission unit as set forth in claim 7, wherein said frictional engagement element includes a first plate connected to said damper disc for rotation therewith, and a friction member connected to said output shaft for rotation therewith, and wherein said clutch piston is formed integrally with a second plate for pressing said friction member between said first and second plates.

13. A hydraulic power transmission unit as set forth in claim 1, wherein an oil passage is formed in said output shaft and communicates with the interior of said cylinder, and further comprising back flow preventing means located between said oil passage and the interior of said casing for allowing a flow of fluid from the interior of said casing to said oil passage, while blocking flow in the reverse direction.

14. A hydraulic power transmission as set forth in claim 13, wherein said output shaft terminates at a point axially adjacent said damper disc, leaving an axial space at the radially inner side of said damper disc, and wherein said back flow preventing means is arranged in said axial space and is fixed to said damper disc.

15. A hydraulic power transmission unit as set forth in claim 14, further comprising a stator, and wherein an oil passage for circulating the oil through the interior of said casing is formed between a support shaft for said stator and said casing and between said support shaft and said output shaft, and wherein an oil passage for feeding/releasing the oil to actuate said clutch piston is formed in said output shaft in communication with the interior of said cylinder.

16. A hydraulic power transmission unit as set forth in claim 1:
   wherein said frictional engagement element includes a plate connected to said damper disc for rotation therewith, and a friction member connected to said output shaft for rotation therewith, and
   wherein said clutch piston carries plate engaging means for engaging said plate to prevent relative rotation between said clutch piston and said plate.

17. A hydraulic power transmission unit as set forth in claim 1, wherein said damper disc is in the form of an annular cylinder, in which said clutch piston is slidably mounted, and is fixed around its outer periphery to at least one spring bracket, against which said springs abut.

18. A hydraulic power transmission unit as set forth in claim 1, wherein said frictional engagement element includes a first plate connected to said damper disc for rotation therewith, and a friction member connected to said output shaft for rotation therewith, and wherein said clutch piston is formed integrally with a second plate for pressing said friction member between said first and second plates.

19. A hydraulic power transmission unit as set forth in claim 18, further comprising:

a seal piston mounted within said casing for axial sliding relative to said clutch piston and said damper disc and for forming a seal between said damper disc and said clutch piston.

20. A hydraulic power transmission unit as set forth in claim 1, further comprising a stator, and wherein an oil passage for circulating the oil through the interior of said casing is formed between a support shaft for said stator and said casing and between said support shaft and said output shaft, and wherein an oil passage for feeding/releasing the oil to actuate said clutch piston is formed in said output shaft in communication with the interior of said cylinder.

* * * * *